(12) United States Patent
Chiueh et al.

(10) Patent No.: US 8,321,942 B1
(45) Date of Patent: Nov. 27, 2012

(54) SELECTING MALWARE SIGNATURES BASED ON MALWARE DIVERSITY

(75) Inventors: Tzi-cker Chiueh, Los Angeles, CA (US); Kent E. Griffin, Santa Monica, CA (US); Scott Schneider, Santa Monica, CA (US); Xin Hu, Ann Arbor, MI (US)

(73) Assignee: Symantec Corporation, Mountain View, CA (US)

( * ) Notice: Subject to any disclaimer, the term of this patent is extended or adjusted under 35 U.S.C. 154(b) by 597 days.

(21) Appl. No.: 12/403,335

(22) Filed: Mar. 12, 2009

(51) Int. Cl.
*G06F 21/56* (2006.01)
(52) U.S. Cl. .................. 726/24; 726/22; 726/23
(58) Field of Classification Search ............ 726/22–24
See application file for complete search history.

(56) References Cited

U.S. PATENT DOCUMENTS

| 5,452,442 | A * | 9/1995 | Kephart | 714/38.1 |
| 6,732,149 | B1 * | 5/2004 | Kephart | 709/206 |
| 2006/0107321 | A1 * | 5/2006 | Tzadikario | 726/22 |
| 2006/0161986 | A1 * | 7/2006 | Singh et al. | 726/24 |
| 2006/0212942 | A1 * | 9/2006 | Barford et al. | 726/24 |
| 2008/0127336 | A1 | 5/2008 | Sun et al. | |
| 2009/0265786 | A1 * | 10/2009 | Xie et al. | 726/24 |

OTHER PUBLICATIONS

Jin et al., "Normalization towards Instruction Substitution Metamorphism Based on Standard Instruction Set", 2007 International conference on Computational Intelligence and Security Workshops, IEEE (2007).*

Karnik et al., "Detecting Obfuscated Viruses Using Cosine Similarity Analysis", Proceedings of the First Asia International Conference on Modelling & Simulation, IEEE (2007).*
Kruegel et al., "Polymorphic Worm Detection Using Structural Information of Executables", Proceedings of the International Symposium on Recent Advances in Intrusion Detection (RAID) (2005).*
Ma et al., "Finding Diversity in Remote Code Injection Exploits", IMC '06 Proceedings of the 6th ACM SIGCOMM Conference on Internet Measurement, ACM (2006).*
Newsome et al., "Polygraph—Automatically Generating Signatures for Polymorphic Worms", Proceedings of the 2005 IEEE Symposium on Security and Privacy, IEEE (2005).*
Wang et al., "STILL—Exploit Code Detection via Static Taint and Initialization Analyses", 2008 Annual Computer Security Applications Conference, IEEE (Dec. 12, 2008).*
Zhang et al., "MetaAware: Identifying Metamorphic Malware", 23rd Annual Computer Security Applications Conference, IEEE (2007).*
Bustamante, P., "Fenomen(al) False Positives," Panda Research Blog, pp. 1-8, [Online] [Retrieved on Mar. 12, 2010] Retrieved from the Internet<URL:http://research.pandasecurity.com/fenomenal-false-positives/>.

(Continued)

*Primary Examiner* — Kaveh Abrishamkar
*Assistant Examiner* — Theodore Parsons
(74) *Attorney, Agent, or Firm* — Fenwick & West LLP

(57) ABSTRACT

A candidate signature for a known malware entity is selected for analysis. A set of malware entities that contain the candidate signature is identified. A diversity measurement for the candidate signature is determined. The diversity measurement describes the diversity of the set of malware entities that contain the candidate signature. A determination is made whether to use the candidate signature to identify the known malware entity based at least in part on the diversity measurement. Responsive to the determination, the candidate malware signature is stored as a signature for the known malware entity.

18 Claims, 9 Drawing Sheets

OTHER PUBLICATIONS

Chiueh, T., Constraints, Style and Focus of Industrial Computer Security Research, Symantec Research Labs and Stony Brook University, RAID 2007, pp. 1-44, [Online] [Retrieved on Mar. 12, 2010] Retrieved from the Internet<URL:http://conf.isi.qut.edu.au/raid07/keynotes/Chieuh_raid2007.ppt>.

Deng, P.S. et al., "Intelligent Automatic Malicious Code Signatures Extraction," IEEE, 2003, pp. 600-603.

Kim, H-A. et al., "Autograph: Toward Automated, Distributed Worm Signature Detection," 2004, 16 pages, [Online] [Retrieved on Mar. 12, 2010] Retrieved from the Internet<URL:http://www.cs.ucl.ac.uk/staff/B.Karp/autograph-usenixsec2004.pdf>.

Kim, H-A. et al., "Autograph: Toward Automated, Distributed Worm Signature Detection," [Online] [Retrieved on Mar. 12, 2010] Retrieved from the Internet<URL:www.lib.unb.ca/engineering/usenix/04security/tech/full_papers/kim/kim_html/autograph-html.html>.

Kumar, E. U., "About Computer Security & The Average Computer User," Bashing Up a Backlog of Malware, Anti-Malware Research, [Online] [Retrieved on Apr. 12, 2010] Retrieved from the Internet<URL:http://fightmalware.blogspot.com/2007_10_01_archive.html>.

Liang, Z. et al., "Automated, Sub-second Attack Signature Generation: A Basis for Building Self-Protecting Servers" pp. 1-18, [Online] [Retrieved on Mar. 12, 2010] Retrieved from the Internet<URL:http://seclab.cs.sunysb.edu/seclab/pubs/papers/seclab-05-02.pdf.

Ma, Justin et al., "Finding Diversity in Remote Code Injection Exploits—SlideShare," pp. 1-38, [Online] [Retrieved on Mar. 12, 2010] Retrieved from the Internet<URL:http://www.slideshare.net/amiable_indian/finding-diversity-in-remote-code-injection-exploits>.

Park, B-C. et al, "Towards Automated Application Signature Generation for Traffic Identification," 2008, IEEE, pp. 160-167, [Online] [Retrieved on Mar. 12, 2010[ Retrieved from the Internet<URL:http://dpnm.postech.ac.kr/papers/NOMS/08/signature.pdf>.

Sathyanarayan, V.S. et al., "Signature Generation and Detection of Malware Families," Proceedings of the 13$^{th}$ Australasian Conference on Information Security and Privacy, Lecture Notes in Computer Science, 2008, pp. 336-349, vol. 5107.

* cited by examiner

US 8,321,942 B1

SELECTING MALWARE SIGNATURES BASED ON MALWARE DIVERSITY

BACKGROUND OF THE INVENTION

1. Field of the Invention

This invention pertains in general to computer security and in particular to the development of signatures to accurately identify malicious software.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can stealthily capture important information such as logins, passwords, bank account identifiers, and credit card numbers. Similarly, the malware can provide hidden interfaces that allow the attacker to access and control the compromised computer.

One method used to detect malware is to identify malware signatures. Malware signatures contain data describing characteristics of known malware and are used to determine whether an entity such as a computer file or a software application contains malware. Typically, a set of malware signatures is generated by a provider of security software and is deployed to security software on a user's computer. This set of malware signatures is then used by the security software to scan the user's computer for malware.

During malware signature generation, malware signatures are typically validated against entities that are known to not contain malware, herein referred to as "goodware," in order to ensure that the malware signatures do not generate false positive identifications of malware. In other words, the malware signatures are validated to ensure they do not falsely identify goodware as malware. Typically, a malware signature is first generated by a security analyst or a computer and then compared to a dataset of goodware in order to determine whether the malware signature generates false positive identifications of malware. Due to the large size of the dataset of all known goodware and the rapidly increasing amount of malware, generating malware signatures and vetting these signatures against a dataset of goodware has become increasingly difficult.

Accordingly, there is a need in the art for ways to generate malware signatures which do not rely on a comparison with a dataset of goodware and are unlikely to cause false positive detections.

BRIEF SUMMARY

The above and other needs are met by a computer-implemented method, a computer program product and a computer system for selecting a signature for a malware entity. One embodiment of the computer-implemented comprises selecting a candidate signature for a known malware entity for analysis. A set of malware entities that contain the candidate signature is identified. The computer-implemented method further determines a diversity measurement for the candidate signature, wherein the diversity measurement describes a diversity of the set of malware entities that contain the candidate signature. The computer-implemented method determines whether to use the candidate signature to identify the known malware entity based at least in part on the diversity measurement. The candidate malware signature is stored as a signature for the known malware entity responsive to the determination to use the candidate signature.

Embodiments of the computer program product have a computer-readable storage medium storing computer-executable code for selecting a signature for a malware entity. The code comprises a diversity determination module configured to select a candidate signature for a known malware entity for analysis. The diversity determination module identifies a set of malware entities that contain the candidate signature. The diversity determination module is further configured to determine a diversity measurement for the candidate signature, wherein the diversity measurement describes a diversity of the set of malware entities that contain the candidate signature. The code further comprises a signature selection module configured to determine whether to use the candidate signature to identify the known malware entity based at least in part on the diversity measurement. The signature selection module also stores the candidate malware signature as a signature for the known malware entity responsive to the determination to use the candidate signature.

Embodiments of the computer-implemented system comprise a computer processor and a computer-readable storage medium storing computer program modules configured to execute on the computer processor. The computer program modules comprise a diversity determination module configured to select a candidate signature for a known malware entity for analysis. The diversity determination module identifies a set of malware entities that contain the candidate signature. The diversity determination module is further configured to determine a diversity measurement for the candidate signature, wherein the diversity measurement describes a diversity of the set of malware entities that contain the candidate signature. The computer program modules further comprise a signature selection module configured to determine whether to use the candidate signature to identify the known malware entity based at least in part on the diversity measurement. The signature selection module also stores the candidate malware signature as a signature for the known malware entity responsive to the determination to use the candidate signature.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
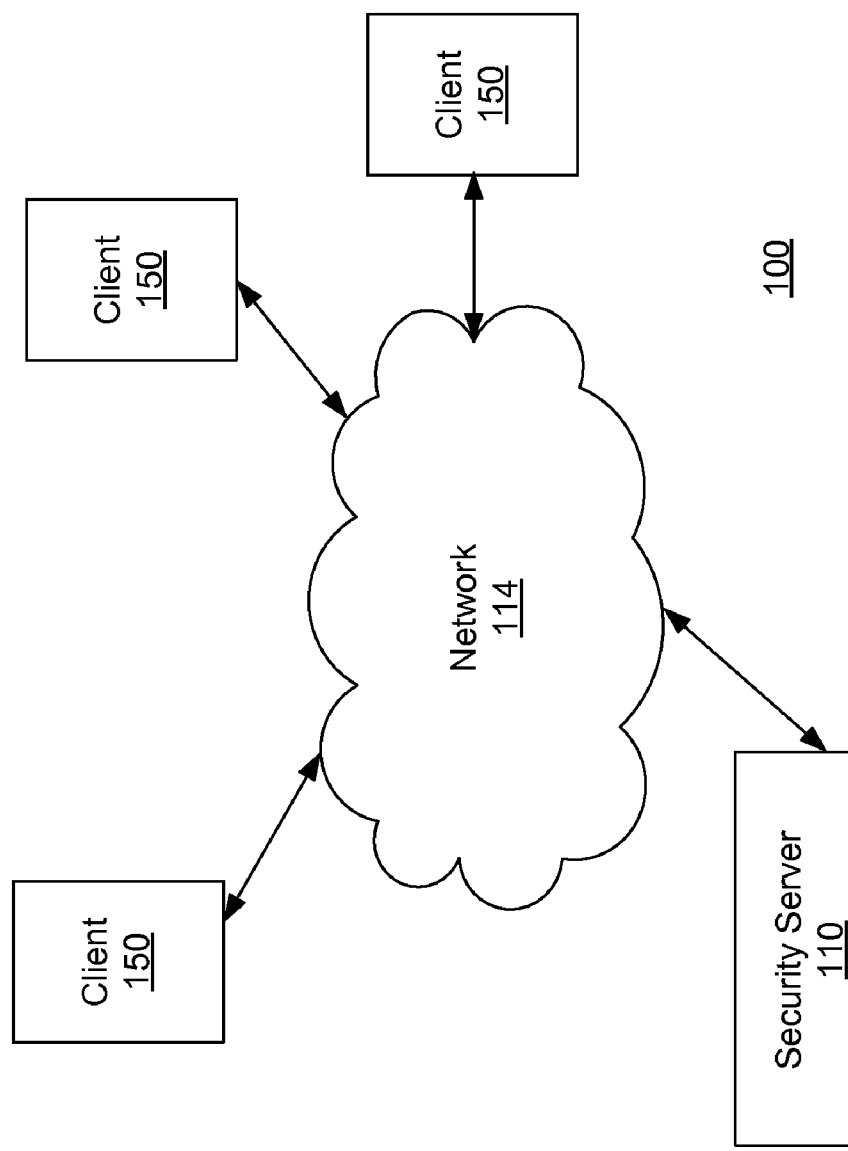
FIG. 1 is a high-level block diagram of a computing environment according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

Generally, the security server 110 generates malware signatures for known malware. A signature is any characteristic such as a pattern, metadata or sequence associated with an entity (e.g., software applications or executable files) that can be used to accurately identify the entity as malware. In the embodiments discussed herein, a malware signature for detecting a particular malware entity contains a sequence of code derived from that entity. In order to generate the malware signature, the security server 110 analyzes the malware to determine multiple candidate malware signatures from the malware itself. In one embodiment, the candidate malware signatures are sequences of code that refer to an ordered set of one or more data elements, such as computer processor instructions, occurring within the malware.

The security server 110 compares the candidate malware signatures to known malware entities to determine the number of malware entities that contain the signatures. In one embodiment, for each candidate signature, the security server 110 applies a threshold to remove those candidate signatures that are included in a large number of malware entities. The signatures which are found in a large number of malware entities are dismissed as candidates since they are also likely to be found in goodware and thereby generate false positive malware detections.

The security server 110 selects one or more signatures from the remaining candidates for deployment to clients 150 based at least in part on a diversity principle. According to the diversity principle, a selected malware signature is ideally intrinsic to one or a very small number of malware entities. If a candidate malware signature appears in too diverse a set of malware entities, the candidate malware signature is also likely to occur in goodware. Thus, a candidate malware signature's diversity within the set of malware entities can be used as an indicator of whether the signature is likely to occur in goodware and thereby generate undesirable false positive detections of malware.

In one embodiment, ideally, a candidate signature is found in all malware entities within a malware family. A malware family is a set of malware entities that share the same core functionality, but contain polymorphisms such as re-ordered or different, yet equivalent instructions according to one embodiment. Finding a candidate signature that is intrinsic to the malware family indicates that the signature will not be found in goodware according to one embodiment.

To determine the diversity of the candidate malware signatures, the security server 110 compares each candidate signature to the malware entities in the set. The security server 110 then analyzes the malware entities that contain the candidate signature to determine the distinctiveness of the malware entities and the signature's use in those entities. For each candidate malware signature, the security server 100 generates a diversity measurement that describes the diversity of the malware entities that contain the candidate malware signature.

To select a malware signature from the candidate malware signatures, the security server 110 compares the diversity measurement of each candidate malware signature to a threshold. By comparing the diversity measurement of a candidate malware signature to the threshold, the security server 100 determines whether the candidate signature appears in too diverse a set of malware entities. The security server 100 selects candidate malware signatures that have an associated diversity measurement below the threshold thereby indicating that the selected signatures do not appear in a diverse set of malware entities. By selecting malware signatures based on the diversity of the malware entities that contain the signatures, the need for a goodware data set is reduced.

The security server 110 interacts with the clients 150 via the network 114. The security server 110 deploys a set of the selected malware signatures to the clients 150. The clients 150 use the malware signatures in conjunction with security software to identify malware. In one embodiment, the clients 150 execute security software provided by the security server 110 to scan the clients 150 for entities such as software applications or files which correspond to (e.g., have the sequences found in) the malware signatures.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

The network 114 enables communications between the security sever 110 and the clients 150. In one embodiment, the network 114 uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 114 can also include links to other networks such as the Internet.

Figure 2:
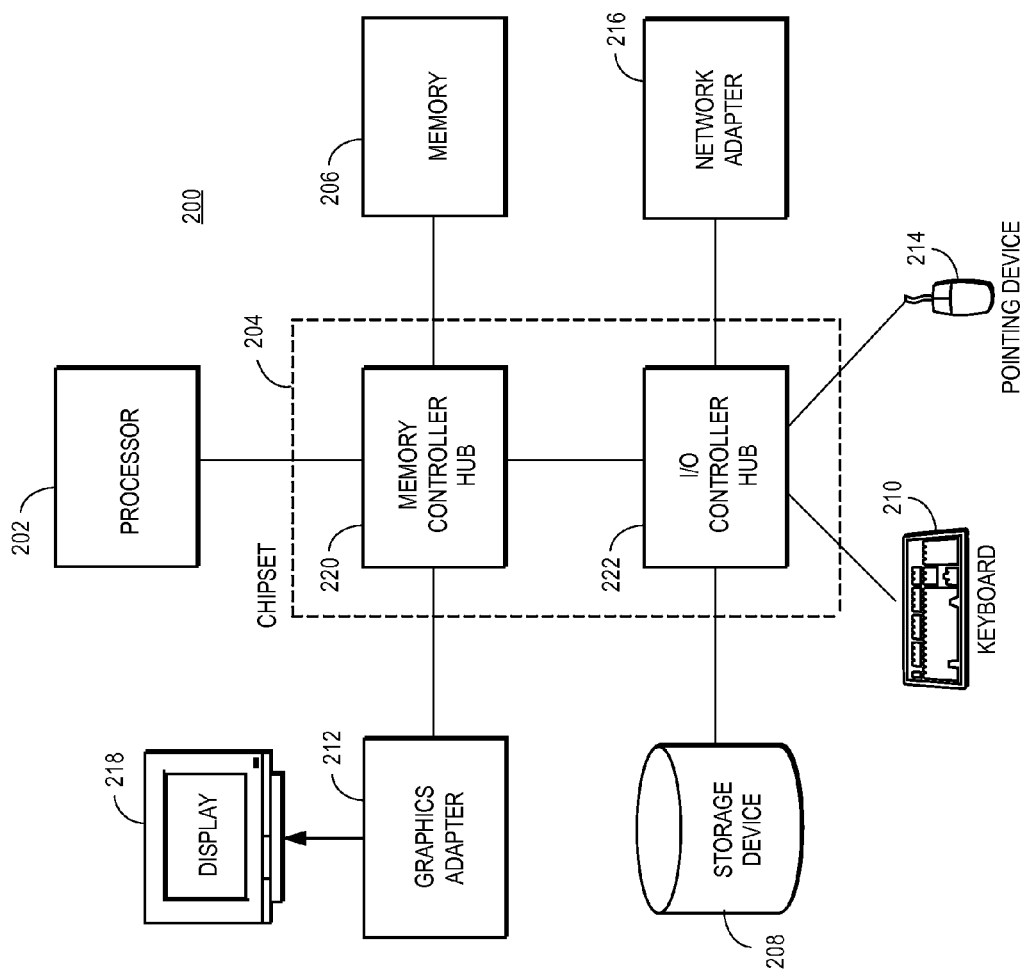
FIG. 2 is a high-level block diagram illustrating a typical computer for use as a security server or a client according to one embodiment.

FIG. 2 is a high-level block diagram of a computer 200 for acting as a security server 110 and/or a client 150 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a security server 110 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
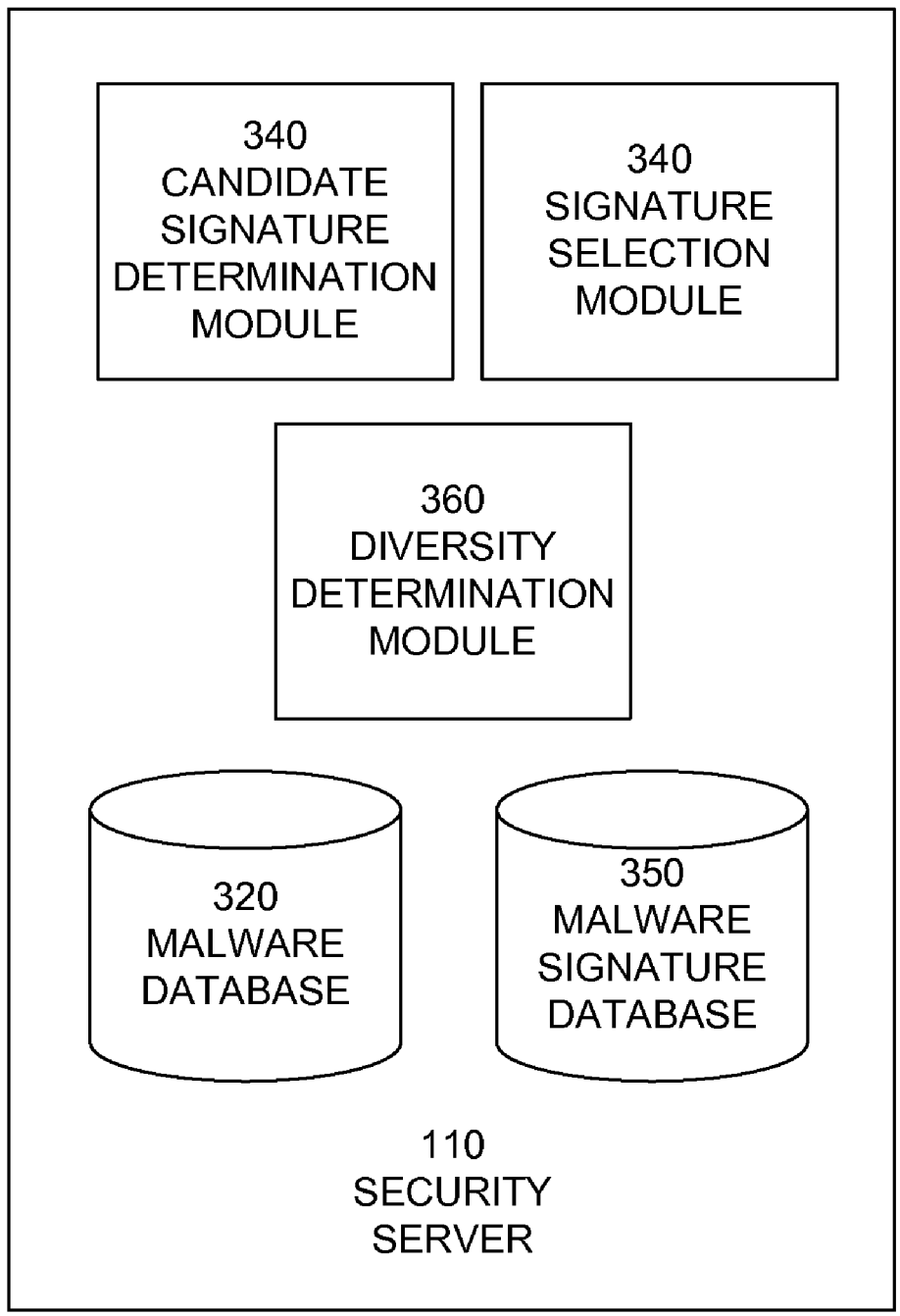
FIG. 3 is a high-level block diagram illustrating a detailed view of a security server according to one embodiment.

FIG. 3 is a high-level block diagram illustrating a detailed view of the security server 110 according to one embodiment. As shown in FIG. 3, the security server 110 includes multiple modules. Those of skill in the art will recognize that other embodiments of the security server 110 can have different and/or other modules than the ones described here, and that the functionalities can be distributed among the modules in a different manner.

The malware database 320 stores a set of known malware entities referred to as a malware dataset. A malware entity is an entity such as a file or software application that exhibits malicious behavior such as a computer virus or computer worm. The set of malware entities can range from hundreds to millions of malware entities. The malware dataset includes executable files of the malware entities that contain executable code formed of data and computer processor instructions.

In one embodiment, the malware dataset is formed of a plurality of malware families. As previously mentioned, a malware family is a set of malware entities that share the same core functionality, but contain polymorphisms such as re-ordered or different, yet equivalent instructions according to one embodiment. Ideally, a candidate signature is found in all malware entities within the same family, but is not found in malware entities in other families. A candidate signature exhibiting this characteristic is a strong signal that the signature is intrinsic to the malware family and will not be found in goodware.

The malware signature database 350 stores a set of malware signatures used to detect malware. As previously mentioned, a signature is any characteristic such as a pattern, metadata or sequence associated with an entity that can be used to accurately identify that the entity is malware. In the embodiments discussed herein, the malware signatures contain sequences derived from known malware entities.

A candidate signature determination (CSD) module 340 generates malware signatures for known malware entities in the malware database 320. According to one embodiment, the CSD module 340 generates multiple candidate malware signatures for a given malware entity. In one embodiment, the CSD module 340 uses a disassembler, such as the IDA PRO disassembler available from Hex-Rays SA of Liège, Belgium, to disassemble an executable file of a malware entity in order to generate a sequence of assembly language instructions. The CSD module 340 generates candidate malware signatures formed of subsequences of the sequence. In one embodiment, the CSD module 340 processes the sequence of assembly language instructions using a sliding window of fixed length to generate (e.g., produce) a set of subsequences representing the candidate malware signatures. According to one embodiment, the length of the sliding window is large enough to fit multiple assembly language instructions, such as 48 bytes. The CSD module 340 is also used to generate candidate malware signatures for new malware entities for which a malware signature has not previously been identified.

Additionally, in one embodiment the CSD module 340 identifies the function in the malware code in which a candidate malware signature resides. This function is called the candidate signature's "enclosing function." The candidate malware signatures and their associated enclosing function information can be stored in the malware database 320 or the malware signature database 350, depending upon the embodiment.

In one embodiment, a diversity determination module 360 measures the diversity of the candidate malware signatures generated by the CSD module 340. Generally, for each candidate malware signature, the diversity determination module 360 identifies the malware entities containing the candidate malware signature. In addition, the diversity determination module 360 analyzes the malware entities containing the candidate malware signature according to various diversity metrics. Using the diversity metrics, the diversity determination module 360 measures the degree of diversity of the malware entities that contain the candidate malware signature to create a diversity measurement that is associated with the candidate malware signature. The diversity measurement is described in further detail with respect to FIG. 4.

The signature selection module 340 selects from among the candidate malware signatures for a given malware entity to identify the signature to provide to clients 150. In one embodiment, the signature selection module 340 selects one or more malware signatures for deployment to clients 150 that are used to detect a given malware entity. The selected malware signature for a given malware entity represents a signature for the malware entity that is least likely to generate a false-positive detection in goodware.

In one embodiment, the signature selection module 340 selects a candidate malware signature as a malware signature for a malware entity based at least in part on the diversity measurement determined by the diversity determination module 360. According to one embodiment, the signature selection module 360 evaluates the diversity measurement by comparing the diversity measurement to a threshold. The signature selection module 360 selects a candidate malware signature if its associated diversity measurement is below the threshold and the signature selection module 340 stores the selected signature. The threshold describes an amount of distinct malware entities that have the candidate malware signature. For example, a candidate signature that is found in multiple malware entities can have a low diversity measurement if the malware entities in which it is found are all members of the same family. Conversely, the candidate signature can have a high diversity measurement if the multiple malware entities in which it is found belong to different families. The threshold may be set to any value as determined by an security analyst associated with the security server 110.

In one embodiment, if the diversity measurement of a candidate malware signature is above the threshold, the candidate malware signature is rejected for use as a malware signature. A diversity measurement greater than the threshold indicates that the associated candidate malware signature is found in a diverse set of malware entities and thus would be likely to generate false positives in goodware.

It is appreciated that the selection mechanism of the signature selection module 340 described above is only one embodiment and other embodiments may be employed using the teachings described herein. For example, in an alternative embodiment, a candidate malware signature with a diversity measurement greater than the threshold is selected as a malware signature rather than being rejected. In this embodiment, a candidate malware signature with a diversity measurement below the threshold is rejected.

In one embodiment, the signature selection module 360 selects a candidate malware signature that does not appear in too many different malware families as a malware signature. Candidate signatures that appear in too many different malware families are more likely to occur in goodware and thereby generate undesirable false positives. In one embodiment, the signature selection module 360 compares a candidate signature's diversity measurement to the threshold and selects the signature if the measurement is below the threshold. A candidate malware signature with a diversity measurement below the threshold is intrinsic to a small number of malware families according to one embodiment. The selected malware signature for a given malware entity may be used to identify other malware entities from the malware family in which the given malware entity belongs.

Figure 4:
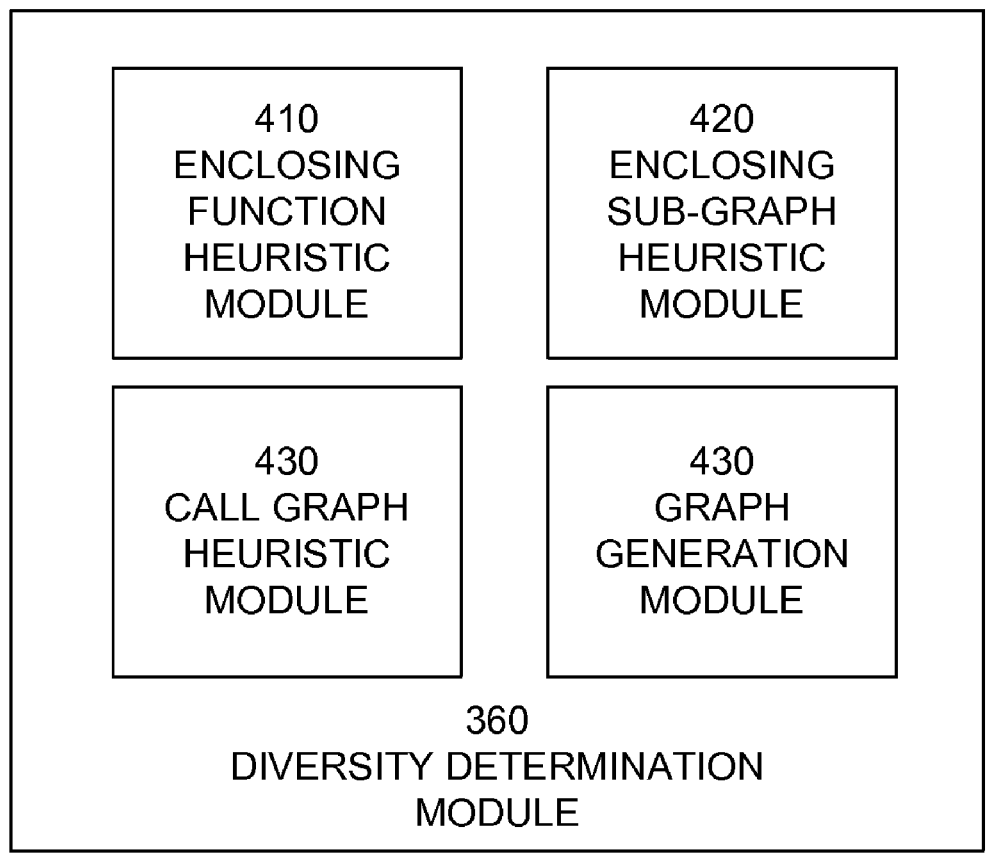
FIG. 4 is a high-level block diagram illustrating a detailed view of a diversity determination module according to one embodiment.

FIG. 4 is a high-level block diagram illustrating a detailed view of the diversity determination module 360 according to one embodiment. As shown in FIG. 4, the diversity determination module 360 includes multiple modules. Those of skill in the art will recognize that other embodiments of the diversity determination module 360 can have different and/or other modules than the ones described here, and that the functionalities can be distributed among the modules in a different manner.

In one embodiment, an enclosing function heuristic (EFH) module 410 determines diversity measurements for the candidate signatures based on a number of distinct (i.e., different) enclosing functions that include the candidate signatures. Generally, to determine the number of distinct enclosing functions, the EFH module 410 analyzes the code of the malware entities that contain a candidate malware signature to identify the functions that enclose the candidate malware signature. In one embodiment, the diversity measurement is proportional to the number of different enclosing functions that include a candidate malware signature. For example, the greater the number of different enclosing functions that include a candidate malware signature, the greater the diversity measurement will be for the candidate signature. In the following description below, we assume existence of a candidate malware signature and a set of malware entities that contain the candidate malware signature.

For a candidate malware signature, the EFH module 410 determines if the enclosing functions of the malware entities from the set are distinct from one another using various function level criteria. In one embodiment, the EFH module 410 determines whether the enclosing functions are distinct by determining if the enclosing function of each malware entity are identical at the byte level. The EFH module 410 extracts enclosing functions from the malware entities in the set by using a disassembler to disassemble the enclosing functions of the malware entities thereby generating byte sequences that represent the enclosing functions. The EFH module 410 compares the byte sequences of pairs of enclosing functions to determine whether the sequences are identical. If two sequences are not identical, their respective enclosing functions are considered distinct from each other. If two sequences are identical, their respective enclosing functions are not distinct.

The process described above is repeated by the EFH module 410 for each pair-wise combination in the set. That is, the EFH module 410 compares each enclosing function to the other enclosing functions in the set to determine whether the enclosing functions are distinct. Once the EFH module 410 has completed the comparison of all the enclosing functions in the set, the EFH module 410 determines the total number of distinct enclosing functions. In one embodiment, the EFH module 410 generates a diversity measurement based on the number of distinct enclosing functions. Alternatively, the EFH module 410 sets the number of distinct enclosing functions as the diversity measurement. The diversity measurement may also be set to the ratio of the number distinct enclosing functions relative to the total number of malware entities that include the signature.

In another embodiment, the EFH module 410 determines whether the enclosing functions are distinct based on the instruction op-code sequences of the enclosing functions, rather than based on the entire byte sequences. The EFH module 410 uses the disassembler to disassemble the enclosing functions of the malware entities in the set to generate an assembly language representation of the enclosing functions. In one embodiment, for each enclosing function from the set, the EFH module 410 extracts the op-code portion of every instruction in the enclosing function to create a sequence of op-codes. The instruction operands are ignored by the EFH module 410. Thus, this embodiment is resistant to intentional or accidental polymorphism that manifest in the operands. Once the op-code sequences for each enclosing function is created, the EFH module 410 compares each pair-wise combination of op-code sequences, rather than byte sequences, to determine the distinctiveness of the enclosing functions.

In one embodiment, the EFH module 410 can further analyze each extracted op-code and normalize the op-code into its canonical representation. For example, in an X86 computer architecture, there may be ten different variants for the ADD op-code and each of the different variants is translated into the same op-code. By normalizing the variants, the EFH module 410 reduces the number of distinct enclosing functions that would otherwise occur.

The EFH module 410 may also perform de-obfuscating normalization on a sequence of op-codes. That is, the EFH module 410 translates a first set of op-codes into one or more different op-codes that perform the same function as the first set. For example, a PUSH instruction followed by a POP instruction can be translated into a single, equivalent, MOV instruction by the EFH module 410.

Once the op-codes in each sequence are normalized, the EFH module 410 compares pair-wise combinations of the sequences of op-codes to determine how many distinct enclosing functions are present in the set of malware entities that comprise the candidate malware signature. If a pair of sequences are not identical, their respective enclosing functions are distinct. If the pair of sequences are identical, their respective enclosing functions are not distinct.

In one embodiment, the diversity determination module 360 includes a graph generation module 430 that generates function call graphs used to generate diversity measurements. A function call graph for a malware entity includes a node for each function called by the malware entity during execution. The edges between the nodes indicate which function called which other function. The graph generation module 430 can generate a complete function call graph for a malware entity or a sub-graph (i.e., portion) of the complete function call graph.

In one embodiment, the graph generation module 430 generates an enclosing sub-graph that represents a portion of a complete function call-graph that is centered on the enclosing function. The sub-graph can extend to include parent and child nodes that are N function calls away from the center node that represents the enclosing function. In one embodiment, N is generally set to 1 or 2 although different N values can be used in different embodiments. The N-distance value describes the maximum distance any neighbor node in the sub-graph can be from the center node.

In one embodiment, the graph generation module 430 labels each node in a call graph. The labels are used by the enclosing sub-graph heuristic module 420 and/or the call graph heuristic module 430, which are further described below, to compare pairs of call graphs to determine whether the nodes in the call graphs are different from each other or if the nodes are the same. To label a call graph, the graph generation module 430 first uses the disassembler to extract assembly language instructions from the malware entity associated with the call graph in order to identify the functions in the malware entity.

In one embodiment, the graph generation module 430 identifies library functions and non-library functions from the extracted assembly instructions. For each call graph node that corresponds to a library function, the graph generation module 430 labels the node with the library function's name. For each call graph node that corresponds to a non-library function, the graph generation module 430 labels the node with a sequence of known application programming interface (API) calls in the function associated with the node.

In one embodiment, the enclosing sub-graph heuristic (ESH) module 420 determines diversity measurements for a candidate malware signature based on a number of distinct enclosing function sub-graphs. The ESH module 420 communicates with the graph generation module 430 to create an enclosing sub-graph of each malware entity in a set of malware entities that contain a candidate malware signature. Once the enclosing sub-graphs of each malware entity in the set are created, the ESH module 420 compares pairs of enclosing sub-graphs to determine edit distances between each possible pair. According to one embodiment, the edit distance is the number of edits or changes required to make a pair of sub-graphs identical.

For a pair of sub-graphs, the ESH module 420 uses the nodes' labels to determine whether the nodes in the sub-graphs are identical. Given a pair of sub-graphs, the ESH module 420 compares the label of one node in a sub-graph to the label of a corresponding node in the other sub-graph to determine if the nodes are identical. The nodes in the pair of sub-graphs are compared in this manner until the ESH module 420 determines the total number of edits to make a pair of sub-graphs identical. The total number of edits is set as the edit distance by the ESH module 420.

In one embodiment, the ESH module 420 compares the edit distance of a pair of enclosing sub-graphs to a distance threshold which varies based on the N-distance value according to one embodiment. The distance threshold is proportional to the N-distance value of the sub-graphs according to one embodiment. For example, the larger the N-distance, the higher the value of the distance threshold and vice versa. If the ESH module 420 determines that the edit distance between a pair of sub-graphs is greater than the distance threshold, the enclosing sub-graphs are distinct. If the edit distance is less than the distance threshold, the enclosing sub-graphs are indistinct. Once the ESH module 420 has performed all pair wise combinations of the sub-graphs in the set, the ESH module 420 calculates the number of distinct enclosing sub-graphs that contain the candidate malware signature. The ESH module 420 uses the number of distinct enclosing sub-graphs as a basis to generate a diversity measurement for the candidate malware signature. The ESH module 420 may also set the number of distinct enclosing sub-graphs as the diversity measurement or may also set the ratio of the distinct enclosing sub-graphs relative to the total number of sub-graphs that include the signature.

Figure 5B:
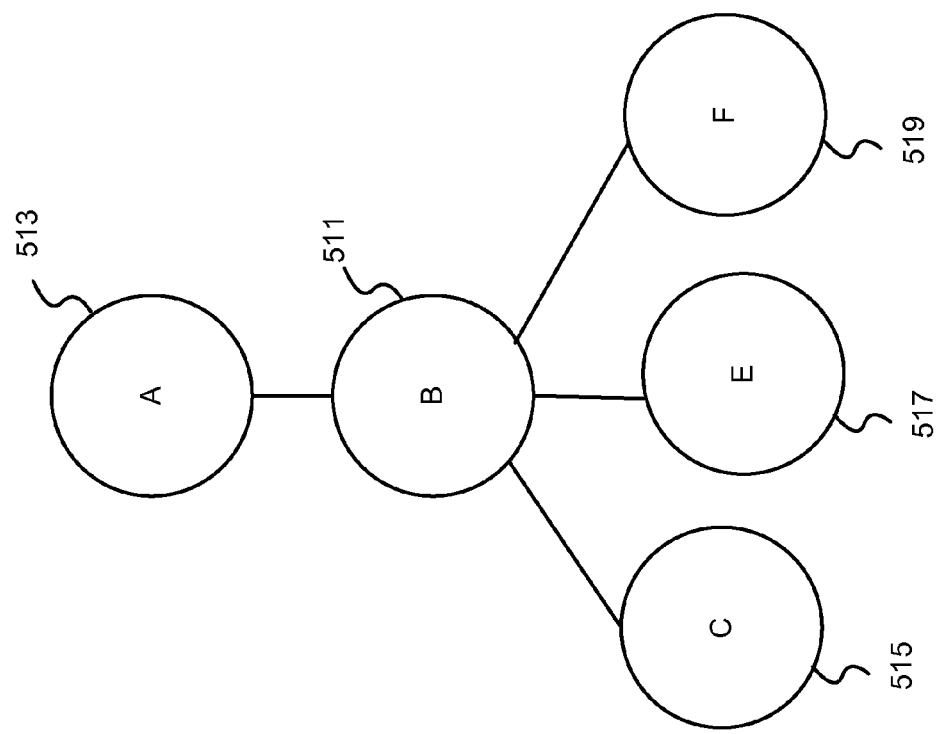
FIG. 5 is an example of a sub-graph of a corresponding function call graph according to one embodiment.
Figure 5A:
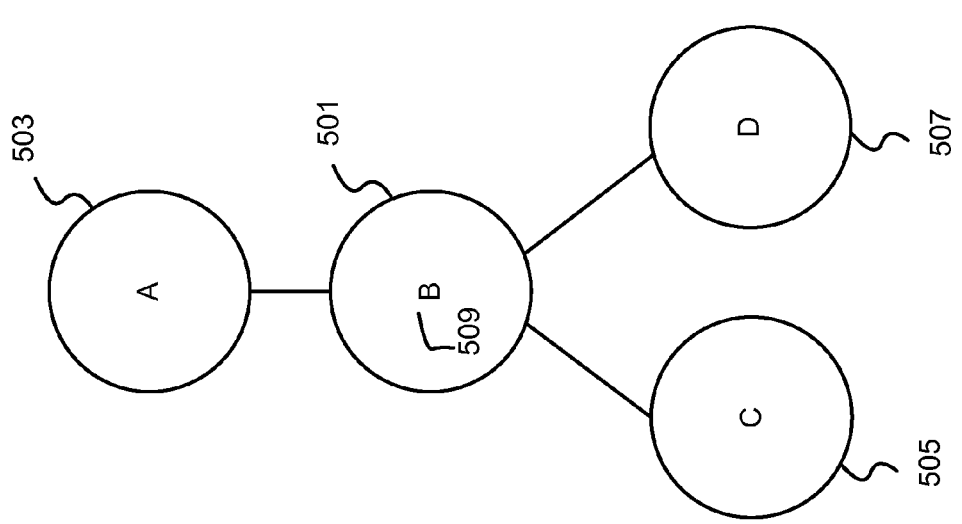

Now referring to FIGS. 5A and 5B, there is shown two example enclosing sub-graphs of two malware entities from the set with an N-distance of one. FIG. 5A illustrates a sub-graph comprising nodes 503, 501, 505, and 507, where node 501 represents the enclosing function for the candidate malware signature. FIG. 5B illustrates a sub-graph comprising nodes 513, 511, 515, 517, and 519, where node 511 represents the enclosing function for the candidate malware signature. FIG. 5A and FIG. 5B both illustrate sub-graphs with a neighbor distance of one. That is, nodes 503, 505, and 507 are each one function call removed from the center node 501 in FIG. 5A. Similarly, in FIG. 5B, nodes 513, 515, 517, and 519 are each one function call removed from the center node 511.

In FIGS. 5A and 5B, each node has a label 509 that indicates the name of the function associated with the node. For ease of description, the nodes shown in FIG. 5A and FIG. 5B are labeled either A, B, C, D, E, or F. As previously mentioned, each node's label is either a library function name or a sequence of known API calls in the function represented by the node. The letters used in FIGS. 5A and 5B are used here to simplify the discussion.

As mentioned above, the ESH module 420 compares enclosing sub-graphs to determine an edit distance between pairs of sub-graphs. For example, the edit distance between the sub-graph of FIG. 5A and the sub-graph of FIG. 5B is two. To make the sub-graph of FIG. 5B identical to the sub-graph of FIG. 5A, node 517 or 519 is deleted which represents one edit and the node which was not deleted would have to be modified to perform the function of node 507 which represents the second edit. Once the edit distance for all pairs of sub-graphs is determined as described above, the ESH module 420 compares the edit distances to the distance threshold to determine the number of distinct enclosing sub-graphs.

Referring back to FIG. 4, in one embodiment, the call graph heuristic (CGH) module 430 determines a diversity measurement for the candidate signature based on a number of clusters or groupings of complete function call graphs. A cluster is a set of complete function call graphs that have a similar edit distance relative to one another, according to one embodiment.

In one embodiment, the CGH module 430 communicates with the graph generation module 430 to create a complete call graph of each malware entity in the set. The CGH module 430 determines the edit distances between pairs of complete call graphs. The CGH module 430 clusters complete call graphs with a low (i.e., small) edit distance to form a cluster. That is, the CGH module 430 clusters graphs that have a low edit distance with respect to each other. Once the CGH module 430 has clustered the call graphs, the CGH module 430 calculates the total number of different clusters in the set. The CGH module 430 uses the total number of different clusters to generate a diversity measurement based on the number of clusters according to one embodiment. The CGH module 430 may also set the number of clusters as the diversity measurement or may also set the ratio of the number of clusters relative to the total number of call graphs that include the signature.

Once a diversity measurement for a candidate malware signature is generated based on the operations of the EFH module 410, the ESH module 420, the CGH module 430, or a combination of the operations performed by the modules, the diversity determination module 360 communicates the diversity measurement to the signature selection module 320. As previously discussed above, the signature selection module 340 compares the diversity measurement to a threshold to determine whether to select the candidate malware signature as a malware signature for the entity or entities that contain the signature. The processes described above can be performed for every unique candidate malware signature generated by the CSD module 340.

Figure 6:
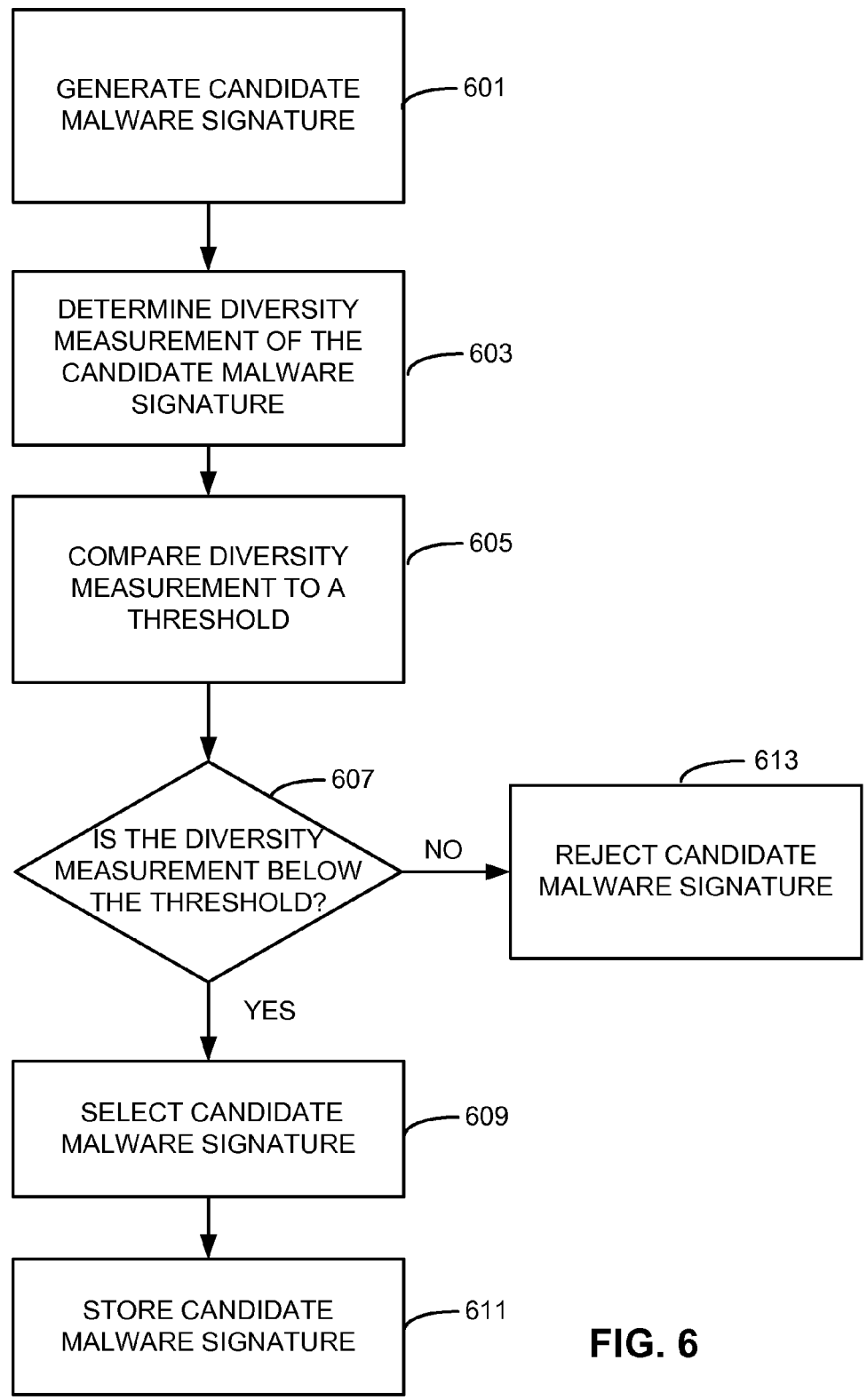
FIG. 6 is a flowchart illustrating steps performed by the security server to select a malware signature for malicious software according to one embodiment.

FIG. 6 is a flowchart illustrating steps performed by the security server 110 to select a malware signature for a set of malware entities that include the signature. Other embodiments perform the illustrated steps in different orders, and/or perform different or additional steps. Moreover, some of the steps can be performed by modules or modules other than the security server 110.

In one embodiment, the security server 110 generates 601 a candidate malware signature. The security server 110 determines 603 a diversity measurement of the candidate malware signature. As previously described above, the diversity measurement indicates the diversity of the malware entities that contain a candidate malware signature. The diversity measurement is compared 605 to a threshold. The security server 110 determines 607 if the diversity measurement is below the threshold. Responsive to the diversity measurement being below the threshold, the security server 110 selects 609 the candidate malware signature as a malware signature for the malware entities that contain the candidate signature and the candidate malware signature is stored 611. Responsive to the diversity measurement being above the threshold, the security server 110 rejects 613 the candidate malware signature from being a malware signature for the malware entities that contain the candidate malware signature.

Figure 7:
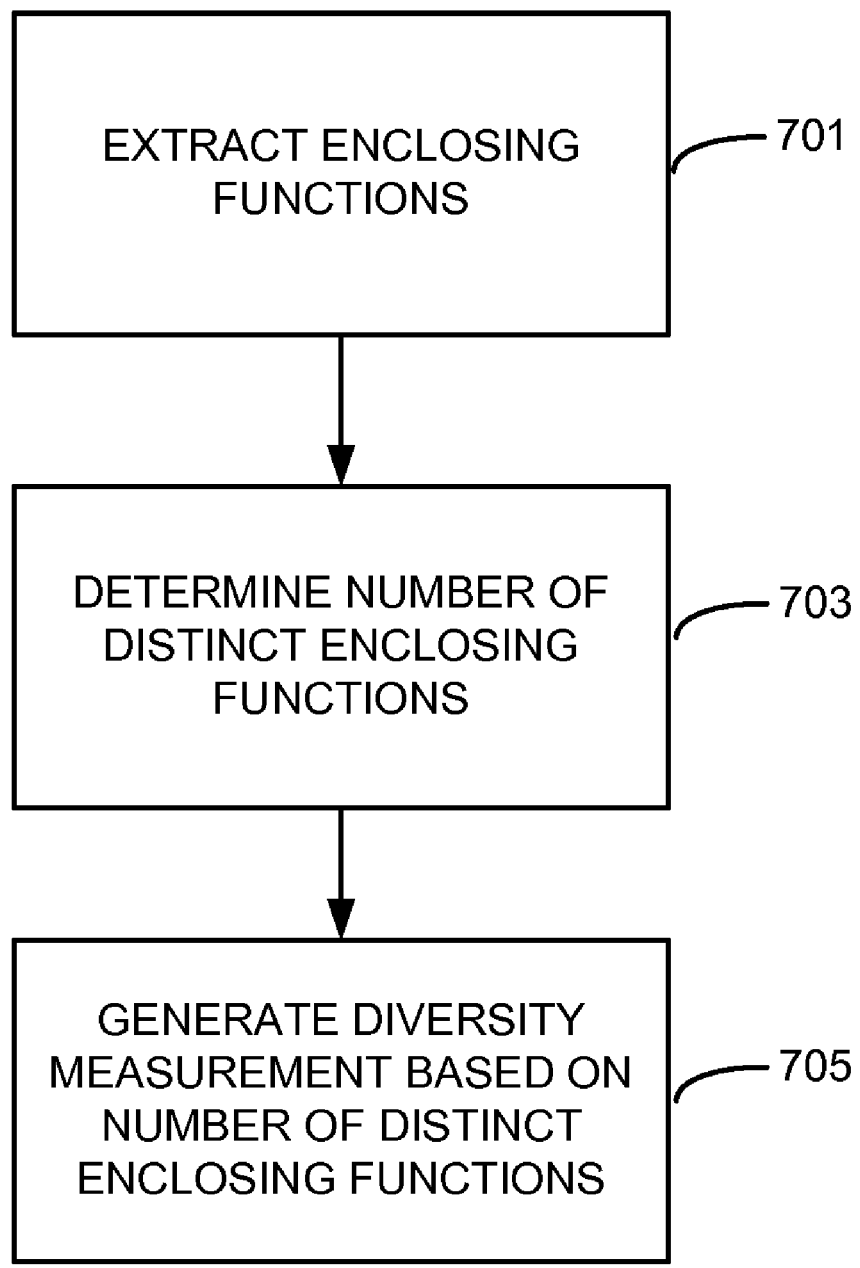
FIG. 7 is a flowchart illustrating steps performed by the security server to determine a diversity measurement of a candidate malware signature using an enclosing function heuristic according to one embodiment.

FIG. 7 is a flowchart illustrating one embodiment of how to determine a diversity measurement of a candidate malware signature (603 of FIG. 6) performed by the security server 110. Other embodiments perform the illustrated steps in different orders, and/or perform different or additional steps. Moreover, some of the steps can be performed by modules other than the security server 110.

In one embodiment, the security server 110 extracts 701 the enclosing function from each malware entity in a set of malware entities that contain a candidate malware signature. The security server 110 determines 703 the number of distinct enclosing functions by comparing pairs of enclosing functions to determine whether the enclosing functions are identical. Once the number of distinct enclosing functions is determined, the security server 110 generates 705 a diversity measurement based on the number of distinct enclosing functions.

Figure 8:
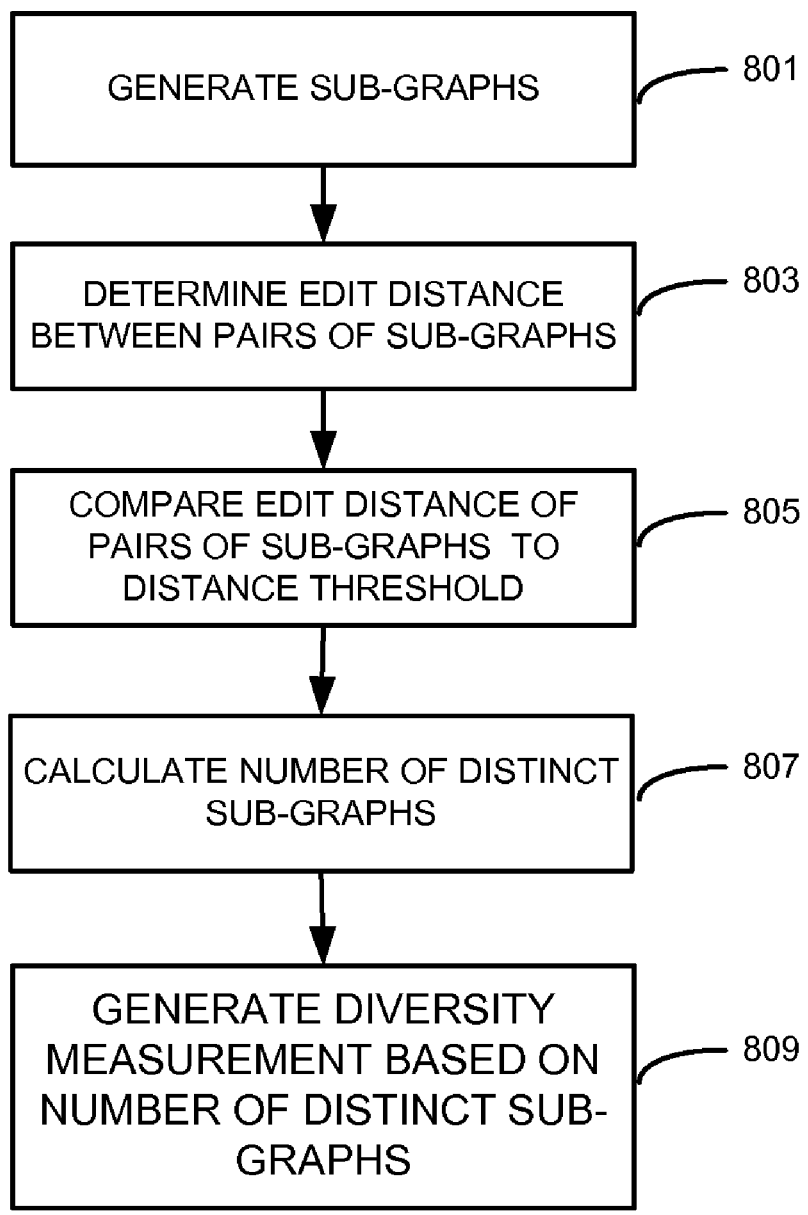
FIG. 8 is a flowchart illustrating steps performed by the security server to determine a diversity measurement of a candidate malware signature using an enclosing sub-graph heuristic according to one embodiment.

FIG. 8 is a flowchart illustrating one embodiment of how to determine a diversity measurement of a candidate malware signature (603 of FIG. 6) performed by the security server 110. Other embodiments perform the illustrated steps in different orders, and/or perform different or additional steps. Moreover, some of the steps can be performed by modules other than the security server 110.

In one embodiment, the security server 110 generates 801 sub-graphs of malware entities in a set of malware entities that contain a candidate malware signature. The security server 110 determines 803 the edit distance between pairs of sub-graphs. The security server 110 then compares 805 the edit distance of the pairs of sub-graphs to a distance threshold to determine the number of distinct sub-graphs. Pairs of sub-graphs with an edit distance above the distance threshold are considered distinct from each other according to one embodiment. The security server 110 calculates 807 the number of distinct sub-graphs. The security server 110 then generates 809 a diversity measurement based on the number of distinct sub-graphs.

Figure 9:
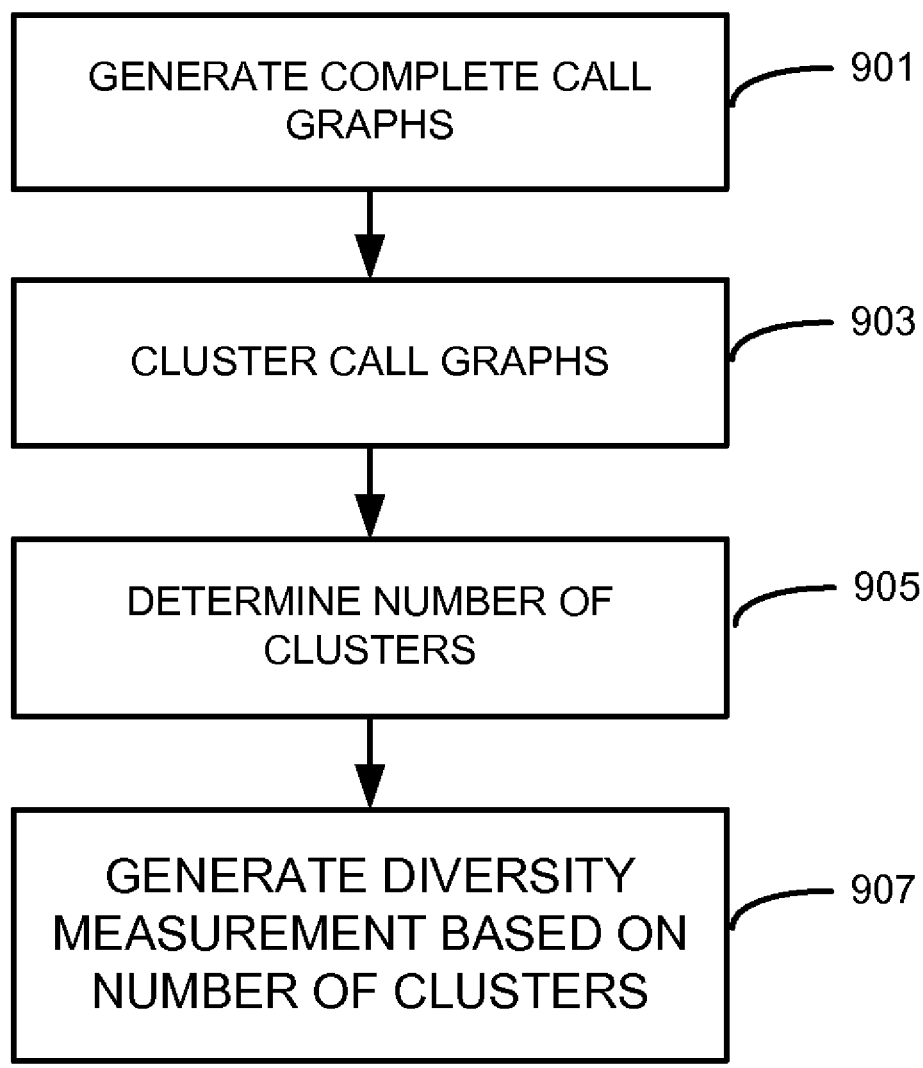
FIG. 9 is a flowchart illustrating steps performed by the security server to determine a diversity measurement of a candidate malware signature using a call graph heuristic according to one embodiment.

FIG. 9 is a flowchart illustrating one embodiment of how to determine a diversity measurement of a candidate malware signature (603 of FIG. 6) performed by the security server 110. Other embodiments perform the illustrated steps in different orders, and/or perform different or additional steps. Moreover, some of the steps can be performed by modules other than the security server 110.

In one embodiment, the security server 110 generates 901 complete function call graphs of malware entities in a set of malware entities that contain a candidate malware signature. The security server 110 clusters 903 the call graphs based on edit distance to create clusters of call graphs that have similar edit distances between the call graphs in the cluster. The security server 110 determines 905 the number of clusters and generates 907 a diversity measurement based on the number of clusters.

The above description is included to illustrate to a security server 110 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:
1. A computer-implemented method for selecting a signature for a malware entity, the method comprising:
 storing a malware dataset that includes executable files of known malware entities and excludes executable files of known goodware entities;
 selecting a candidate signature for a known malware entity from the malware dataset for analysis;
 identifying, using the executable files of the known malware entities in the malware dataset, a set of malware entities comprising a plurality of distinct malware entities that contain the candidate signature;

determining, by a computer, a diversity measurement for the candidate signature, the diversity measurement describing a diversity of the plurality of distinct malware entities that contain the candidate signature and indicating whether the candidate signature is likely to occur in goodware based on the diversity of the plurality of distinct malware entities that contain the candidate signature;

determining whether to use the candidate signature to identify the known malware entity based at least in part on the diversity measurement; and storing the candidate malware signature as a signature for the known malware entity responsive to the determination to use the candidate signature.

2. The computer-implemented method of claim 1, wherein determining the diversity measurement comprises:

analyzing computer program instructions of an executable file of a malware entity in the set;

identifying, based on the analysis, enclosing functions in the computer program instructions that include the candidate signature;

determining a number of distinct enclosing functions; and generating the diversity measurement based at least in part on the number of distinct enclosing functions.

3. The computer-implemented method of claim 2, wherein determining the number of distinct enclosing functions comprises:

identifying an instruction sequence corresponding to each enclosing function;

comparing pairs of the instruction sequences to determine whether the instruction sequences in the pairs are identical; and calculating the total number of distinct enclosing functions based at least in part on a number of identical instruction sequences determined during the comparison.

4. The computer-implemented method of claim 2, wherein determining the number of distinct enclosing functions comprises:

identifying an op-code sequence corresponding to each enclosing function;

normalizing the op-code sequences by converting op-codes within the op-code sequences to canonical forms;

comparing pairs of the normalized op-code sequences to determine whether the normalized op-code sequences in the pairs are identical; and calculating the total number of distinct enclosing functions based at least in part on a number of identical normalized op-code sequences determined during the comparison.

5. The computer-implemented method of claim 1, wherein determining the diversity measurement comprises:

generating function call graphs describing functions called by the executable files of the malware entities in the set if the executable files are executed;

analyzing the function call graphs; and generating the diversity measurement based at least in part on the analysis of the function call graphs.

6. The computer-implemented method of claim 5, wherein generating function call graphs comprises:

analyzing computer program instructions of an executable file of a malware entity in the set;

identifying, based on the analysis, enclosing functions in the computer program instructions that include the candidate signature; and wherein the generated function call graphs are centered on the enclosing functions and describe a subset of the functions called by the malware entities.

7. The computer-implemented method of claim 5, wherein analyzing the function call graphs comprises:

determining edit distances between pairs of function call graphs, wherein an edit distance describes a number of changes needed to make a pair of function call graphs identical;

determining a number of distinct function call graphs based at least in part on the edit distances; and generating the diversity measurement based at least in part on the number of distinct function call graphs.

8. The computer-implemented method of claim 5, wherein analyzing the function call graphs comprises:

clustering the function call graphs to form clusters of function call graphs, wherein each cluster comprises a subset of the function call graphs with low edit distances between the function call graphs in the subset; and generating the diversity measurement based at least in part on a number of different clusters.

9. The method of claim 1, wherein determining whether to use the candidate signature comprises:

comparing the diversity measurement to a threshold; and selecting the candidate signature as a signature for one or more of the plurality of distinct malware entities from the set responsive to the candidate signature's diversity measurement being below the threshold.

10. A computer program product having a non-transitory computer-readable storage medium storing computer-executable code for selecting a signature for a malware entity, the code comprising:

a malware database configured to store a malware dataset that includes executable files of known malware entities and excludes executable files of known goodware entities;

a diversity determination module configured to:

select a candidate signature for a known malware entity from the malware dataset for analysis;

identify, using the executable files of the known malware entities in the malware dataset, a set of malware entities comprising a plurality of distinct malware entities that contain the candidate signature; and determine a diversity measurement for the candidate signature, the diversity measurement describing a diversity of the plurality of distinct malware entities that contain the candidate signature and indicating whether the candidate signature is likely to occur in goodware based on the diversity of the plurality of distinct malware entities that contain the candidate signature; and a signature selection module configured to determine whether to use the candidate signature to identify the known malware entity based at least in part on the diversity measurement and store the candidate malware signature as a signature for the known malware entity responsive to the determination to use the candidate signature.

11. The computer program product of claim 10, wherein the diversity determination module is further configured to:

analyze computer program instructions of an executable file of a malware entity in the set;

identify, based on the analysis, enclosing functions in the computer program instructions that include the candidate signature;

determine a number of distinct enclosing functions; and generate the diversity measurement based at least in part on the number of distinct enclosing functions.

12. The computer program product of claim 11, wherein the diversity determination module is further configured to:

identify an instruction sequence corresponding to each enclosing function;

compare pairs of the instruction sequences to determine whether the instruction sequences in the pairs are identical; and calculate the total number of distinct enclosing functions based at least in part on a number of identical instruction sequences determined during the comparison.

13. The computer program product of claim 11, wherein the diversity determination module is further configured to:

identify an op-code sequence corresponding to each enclosing function;

normalize the op-code sequences by converting op-codes within the op-code sequences to canonical forms;

compare pairs of the normalized op-code sequences to determine whether the normalized op-code sequences in the pairs are identical; and calculate the total number of distinct enclosing functions based at least in part on a number of identical normalized op-code sequences determined during the comparison.

14. A computer system for selecting a signature for a malware entity, the system comprising:

a computer processor; and a computer-readable storage medium storing executable code configured to execute on the computer processor, the code when executed by the computer processor performing steps comprising:

storing a malware dataset that includes executable files of known malware entities and excludes executable files of known goodware entities;

selecting a candidate signature for a known malware entity from the malware dataset for analysis;

identifying, using the executable files of the known malware entities in the malware dataset, a set of malware entities comprising a plurality of distinct malware entities that contain the candidate signature; and determining a diversity measurement for the candidate signature, the diversity measurement describing a diversity of the plurality of distinct malware entities that contain the candidate signature and indicating whether the candidate signature is likely to occur in goodware based on the diversity of the plurality of distinct malware entities that contain the candidate signature; and determining whether to use the candidate signature to identify the known malware entity based at least in part on the diversity measurement and store the candidate malware signature as a signature for the known malware entity responsive to the determination to use the candidate signature.

15. The computer system of claim 14, wherein the code when executed by the computer processor are further configured to perform steps comprising:

analyzing computer program instructions of an executable file of a malware entity in the set;

identifying, based on the analysis, enclosing functions in the computer program instructions that include the candidate signature;

determining a number of distinct enclosing functions; and generating the diversity measurement based at least in part on the number of distinct enclosing functions.

16. The computer system of claim 15, wherein the code when executed by the computer processor is further configured to perform steps comprising:

identifying an instruction sequence corresponding to each enclosing function;

comparing pairs of the instruction sequences to determine whether the instruction sequences in the pairs are identical; and calculating the total number of distinct enclosing functions based at least in part on a number of identical instruction sequences determined during the comparison.

17. The method of claim 1, wherein the malware dataset comprises only malware entities.

18. The method of claim 1, wherein the malware data set comprises a plurality of malware families, each malware family associated with a distinct functionality and including a subset of malware entities from the set of malware entities that exhibit the distinct functionality.

* * * * *